July 24, 1951  T. N. GARSON  2,561,440
DEVICE FOR STEERING OUTBOARD MOTOR BOATS
Filed Feb. 6, 1947
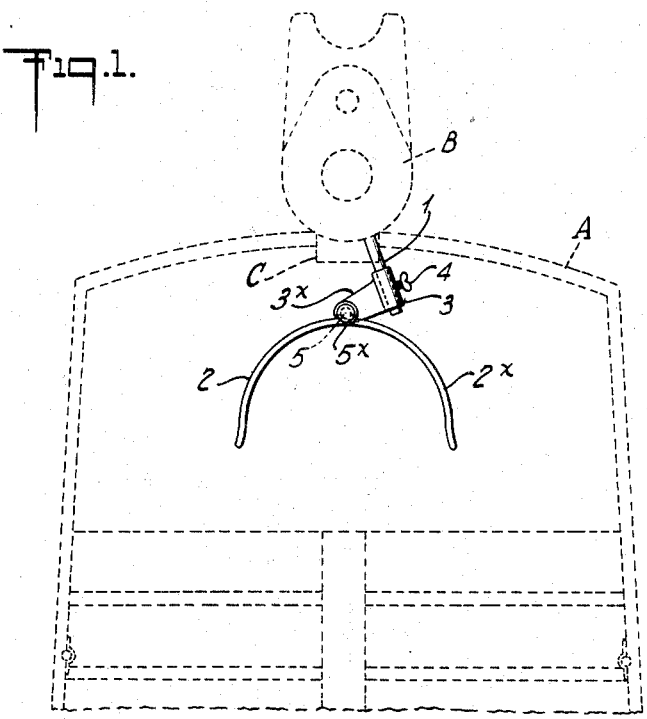
Fig.1.
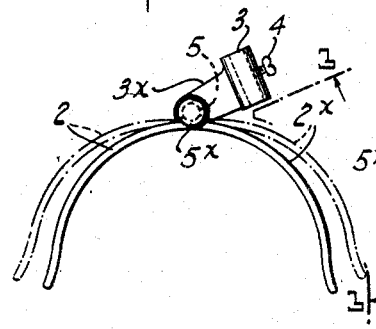 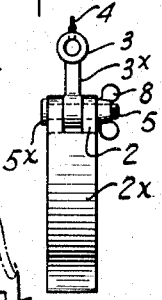 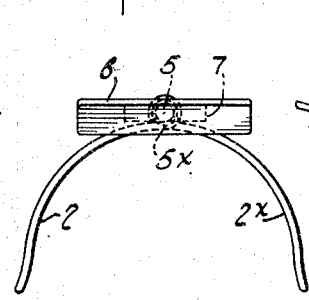 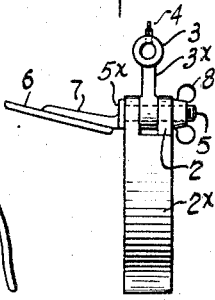
Fig.2. Fig.3. Fig.4. Fig.5.
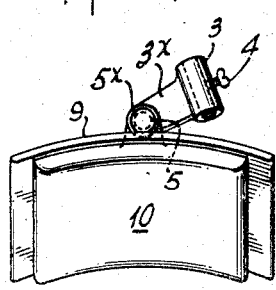 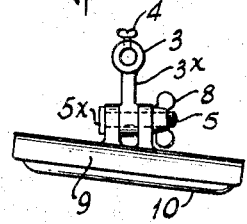
Fig.6. Fig.7.
INVENTOR
Thorvald N. Garson
BY
H. Lee Helms
ATTORNEY Patented July 24, 1951

2,561,440

UNITED STATES PATENT OFFICE 2,561,440

DEVICE FOR STEERING OUTBOARD MOTOR BOATS

Thorvald N. Garson, Staten Island, N. Y.

Application February 6, 1947, Serial No. 726,799

2 Claims. (Cl. 115—18)

This invention relates to a body controlled steering device for outboard motor boats and has for an object a simple, inexpensive and efficient device allowing the operator complete freedom of action by leaving the operator's hands free.

In the conventional type of outboard motors, the steering arm projects from the motor on the left side of the operator who generally sits facing the bow of the boat holding the steering arm handle, requiring a constant grip. This operation is awkward and becomes tiresome, causing discomfort in the long run. Furthermore, it limits the operator to one hand free, making it difficult to perform tasks such as striking a match, fishing and many other performances.

The present invention aims to overcome this inconvenience and accomplishes the object by providing a steering device which connects with the motor steering arm and allows the operator freedom of both hands to perform such tasks as lighting a cigaret, cigar or pipe; hold and operate a fishing rod to troll, fly or bait cast and to perform other tasks desirable when fishing or pleasure boating.

The main object of the invention, therefore, is to provide a steering device controlled by the operator who is comfortably seated in the rear of the boat, in front of the motor, facing the bow of the boat, by rocking the motor on its vertical axis thus steering the boat by a mere slight movement of the body to the left or right, thus holding the boat on the desired course.

Another object of the invention is to provide means for the operator to recline in comfort against a back rest provided on the steering device.

A further object of the invention is to provide simple means for adjusting the back-receiving gap or opening of the device to suit any size operator.

A still further object of the invention is to provide suitable means for attaching the device to the existing motor handle without necessitating changes in its construction.

With the foregoing and other objects in view, the invention will be more fully described hereinafter, with reference to the accompanying drawings, in which:

Fig. 1 is a plan view showing part of a boat provided with an outboard motor having my steering device attached thereto;

Fig. 2 is a plan view of the steering device showing in dotted lines an adjusted position of the gap or opening of the device;

Fig. 3 is a side view of the structure shown in Fig. 2;

Fig. 4 is a view showing application of a back rest, but omitting the steering arm connection;

Fig. 5 is a side elevation of Fig. 3, showing the assembly with back rest and steering arm connection;

Fig. 6 is a perspective view of a modification in which the yoke arms employed in the device of the previous figures is substituted by a cushioned back member. The steering arm connection has purposely been shown bent upwardly for clarity of illustration. Normally it will lie at about a right angle with the back member;

Fig. 7 is a side elevation of the structure shown in Fig. 6.

Referring to the drawing I have shown at A, in plan, the rear part of a boat to which has been attached an outboard motor B, which motor, as customary, will be pivotally mounted on the bracket C which holds it to the stern of the boat as customary. This motor is provided with a steering arm or handle 1, by which the motor may be swung in an arc for the purpose of guiding the boat in its propulsion.

The form shown in Figs. 1 to 5, inclusive, consists of an adjustable body-receiving yoke and a connection for the steering arm which connection itself has endwise adjustment on the arm. The connection, indicated at 3, consists of a sleeve provided with a threaded aperture to receive a threaded wing stud, or screw, 4 by means of which the sleeve may be held in adjusted position longitudinally of the arm 1.

Projected laterally from sleeve 3 is a lever-like extension 3x having an apertured end for receiving a bolt 5 by means of which the yoke is adjustably held.

The yoke preferably consists of two curvilinear arms, 2, 2x each having one end cut into a relatively narrow section which is curved into eye formation. The bolt 5 passes through these eyes, as they are on opposite sides of member 3x, as shown in Figs. 3 and 5. A wing nut 8 on the threaded end of the bolt 5 then may be tightened to react on the bolt collar or head 5x, for holding the yoke arms firmly in adjusted position. Thus they may be spread from the full line position Fig. 2 to the dotted line position or to greater relative spread, as desired, to accommodate users of different body build.

As shown in Fig. 5, to an extension 7 of the bolt outwardly of collar 5x may be secured a back rest 6 as shown in Figs. 4 and 5.

It will be understood that various modifications may be made in the form and arrangement of the elements shown in the drawings without departure from the spirit of the invention. Thus in Figs. 6 and 7 I have shown the yoke arms substituted by a back member 9 which preferably will be cushioned as indicated at 10. The rear of the back member is shown provided with spaced lugs which will receive member $3x$ and which will be apertured to receive the bolt 5.

Having described my invention, what I claim and desire to secure by Letters Patent is as follows:

1. A steering device for a pivotally mounted outboard boat motor, comprising a rigid lever having at one end means for adjustably securing the lever to a steering arm of an outboard motor, a horizontal portion, at the other end of said lever, a pair of curvilinear horizontal arms each having a horizontal portion at one end, a circular bearing aperture extending vertically through each of said horizontal portions, the latter being superimposed in abutting relation with said apertures in vertical alignment, a stud extending vertically through said aligned apertures whereby the arms and the lever are pivotally mounted with respect to each other about the vertical axis of the stud so as to render the arms and the lever relatively moveable and angularly adjustable in a horizontal plane, and means on the stud for clamping said superimposed abutting portions so as to hold the lever and the arms in their respective adjusted positions.

2. The combination set forth in claim 1 and having a backrest secured to and extending upwardly from said vertical stud.

THORVALD N. GARSON.

REFERENCES CITED

The following references are of record in the file of this patent:

UNITED STATES PATENTS

| Number | Name | Date |
|---|---|---|
| 559,244 | Williams | Apr. 28, 1896 |
| 575,787 | Voitek | Jan. 26, 1897 |
| 1,019,646 | Horton | Mar. 5, 1912 |
| 1,061,917 | Materner | May 13, 1913 |
| 1,085,575 | Curtis | Jan. 27, 1914 |
| 1,205,776 | Morgan | Nov. 21, 1916 |
| 1,434,216 | Le Compte | Oct. 31, 1922 |
| 1,531,638 | Zamberletti | Mar. 31, 1925 |
| 1,825,240 | Miller | Sept. 29, 1931 |
| 1,882,323 | Jay | Oct. 11, 1932 |
| 2,309,159 | Binger | Jan. 26, 1943 |

FOREIGN PATENTS

| Number | Country | Date |
|---|---|---|
| 23,865 | Germany | Sept. 10, 1883 |
| 302,074 | Italy | Oct. 19, 1932 |